Aug. 11, 1953   D. A. PALMER   2,648,405
PISTON ASSEMBLY FOR SHOCK ABSORBERS
Filed Dec. 17, 1949
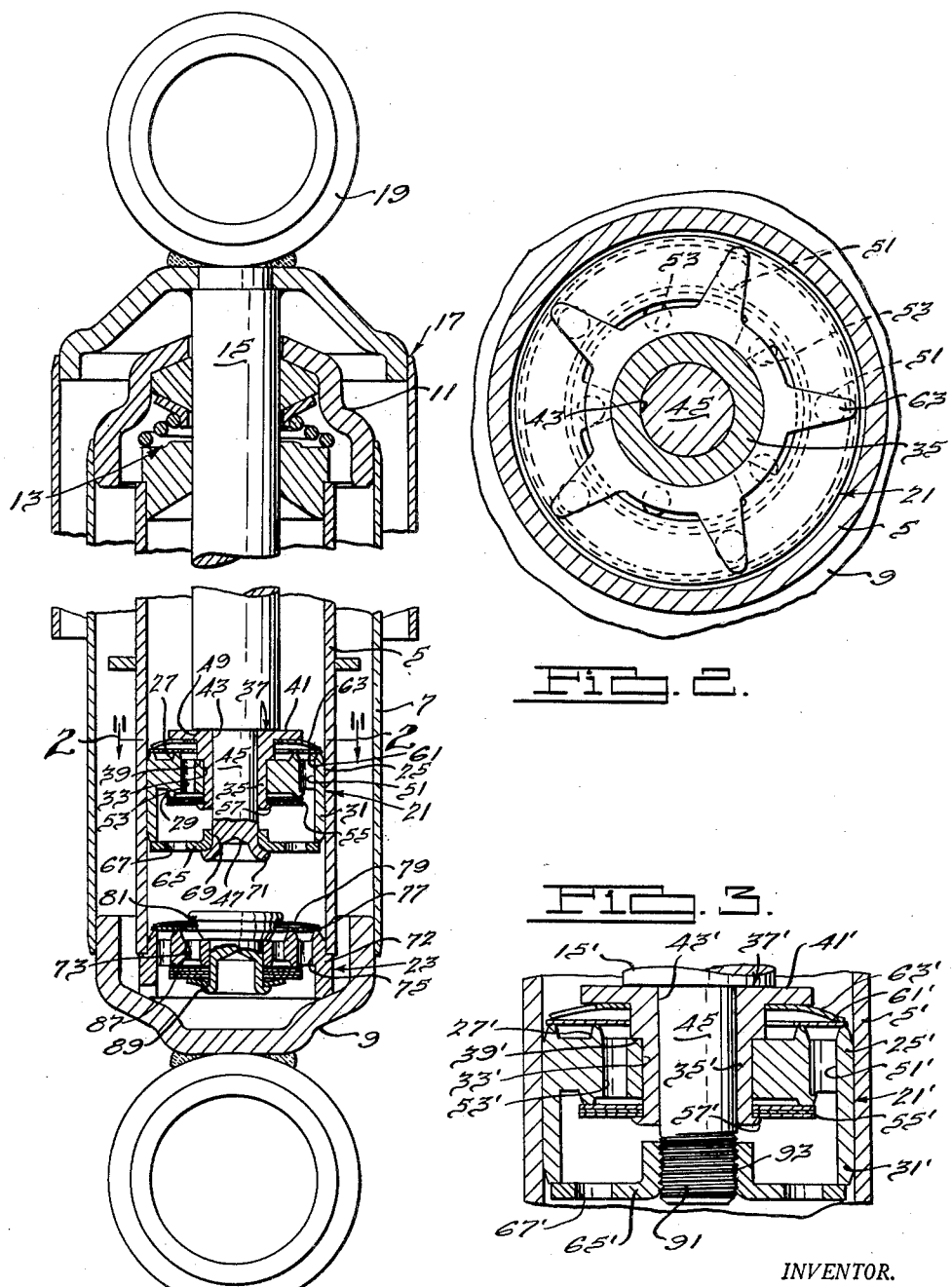
INVENTOR.
Dale A. Palmer.
BY
Harness, Dickey & Pierce.
ATTORNEYS.

Patented Aug. 11, 1953

2,648,405

UNITED STATES PATENT OFFICE 2,648,405

PISTON ASSEMBLY FOR SHOCK ABSORBERS

Dale A. Palmer, Monroe, Mich., assignor to Patent Development Company, Monroe, Mich., a partnership Application December 17, 1949, Serial No. 133,588

3 Claims. (Cl. 188—88)

This invention relates generally to hydraulic shock absorbers and more particularly to an improved piston assembly for such shock absorbers.

It is an object of this invention to provide a piston assembly for a shock absorber which is exceptionally efficient and durable in operation and relatively inexpensive to manufacture.

It is a still further object of this invention to provide a piston assembly of the aforementioned type, in which the valve means for controlling the flow of fluid through the assembly are supported in such a manner as to provide more accurate and consistent shock absorber control than has been heretofore possible.

It is a still further object of this invention to provide a shock absorber piston assembly of the aforementioned type, having a minimum number of parts and assembled in such a manner as to provide the desired shock absorber control for a longer period of time than has been heretofore possible.

These and other objects of this invention will become apparent from the following detailed description, taken in conjunction with the accompanying drawing, in which:

Fig. 1 is a longitudinal sectional view of the shock absorber of this invention;

Fig. 2 is an enlarged sectional view of the structure illustrated in Fig. 1, taken along the line 2—2 thereof; and Fig. 3 is a sectional view similar to Fig. 2, illustrating a further embodiment of the invention.

Referring now to the drawing, it will be seen that the shock absorber includes a pressure cylinder 5 and a concentric reserve tube 7, which cooperates with the pressure cylinder to provide a reserve chamber for hydraulic fluid. The reserve tube 7 is closed at its lower end by means of a closure member 9 and at its upper end by means of a closure member 11. The upper end of the pressure cylinder 5 is closed by means of a rod guide and seal assembly 13, which is disposed between the reserve tube closure 11 and the upper end of the pressure cylinder 5. The assembly 13 and the reserve tube closure 11 are apertured to slidably receive a piston rod 15, which has a conventional dust tube assembly 17, secured to the upper end thereof adjacent a conventional shock absorber mounting fitting 19. A piston assembly 21 is connected to the lower end of the piston rod 15, in a manner which will be hereinafter described. The lower end of the pressure cylinder 5 is closed by means of a base valve assembly 23, which permits communication between the pressure cylinder 5 and reserve chamber, in a substantially conventional manner.

The piston assembly 21 includes a piston body 25, which slidably engages the inner periphery of the pressure cylinder. The piston body 25 has opposed faces 27 and 29, providing valve seats for valve members, to be hereinafter described. The piston body 25 also includes a peripheral skirt 31 which engages the bore of the cylinder 5 and the lower portion of which extends below the bottom piston body face 29. The piston body 25 is provided with a substantially central vertical aperture 33, in which is fitted the shank portion 35 of a tubular element or insert 37. The shank 35 terminates at its upper end in an enlarged circumferential shoulder 39, which when the insert is positioned in the piston body, engages the top face 27 thereof. The insert 37 is further provided with a circumferential flange 41 which is spaced above the shoulder 39, for a reason which will hereinafter appear. The insert 37 is provided with a vertically extending bore 43, through which the reduced lower end 45 of the piston rod 15 extends. The lower end of the piston rod portion 45 projects below the lower end of the insert shank portion 35 and is recessed at 47. The upper end of the reduced piston rod portion 45 terminates in an annular shoulder 49, which when the piston rod is inserted into the insert 37, will abut the top surface of the insert annular flange 41.

The piston rod body 25 is provided with an outer set of circumferentially spaced passageways 51 and an inner set of circumferentially spaced passageways 53. The passageways 53 have their lower ends normally closed by means of a laminated disk valve 55, which engages the valve seat on the bottom piston body face 29. The laminated disk valve 55 is provided for controlling the flow of fluid from the upper portion of the pressure cylinder to the lower portion thereof, and the disk valve 55 is loaded, so that it will only open at a predetermined fluid pressure, by means of an annular flange 57, formed by spinning over the lower end of the insert shank portion 35. The lower end of the shank 35 is spun over so as to apply a predetermined pressure against the inner peripheral portions of the valve disk 55 and thereby preload the same so that the outer peripheral portion thereof can be moved away from its valve seat only by a predetermined fluid pressure.

The upper ends of the piston body passageways 51 are normally closed by valve means including a disk 61 and a star spring 63. The disk and the spring are sleeved on the insert 37 between the shank portion 35 and the upper flange 41 thereof and the inner peripheral portion of the star spring 63 abuts the under side of the insert flange 41 so as to normally resiliently retain the disk 61 in engagement with the valve seat provided on the piston body face 27. It will thus be appreciated that the insert 37 provides common means for retaining the valve means for both sets of piston body passageways on their respective valve seats and at the same time provides a support for the enlarged portion of the piston rod 15 to prevent the piston rod from moving relative to the piston body, in one direction. In order to prevent the piston rod from moving relative to the piston body, in the opposite direction, suitable means are provided for securing the rod to the piston body. The means illustrated in Figs. 1 and 2 include a washer-like element 65 having a plurality of apertures 67 therein, so as not to affect the flow of fluid from one side of the piston body to the other. The washer element 65 has an outside diameter just slightly less than the inside diameter of the pressure cylinder 5, and abuts the lower end of the piston body skirt 31. The washer element 65 is centrally apertured at 69 and the lower end of the reduced piston rod portion 45 projects therethrough. The extreme lower end of the piston rod portion 45 is then spun over or upset at 71, so as to engage the inner peripheral portion of the washer 65 and provide a rigid connection between the lower end of the piston rod and the piston body skirt. In this way the piston rod, piston body, and insert 37 are secured in an assembled relationship to form the piston assembly.

The base valve assembly 23 may be of any suitable type, but is illustrated as being of the type including a valve body 72 having two radially spaced sets of circumferentially spaced passageways 73 and 75. The upper ends of the outer set of passageways 75 are normally closed by means of disks 77 and a star spring 79. The spring 79 is loaded by means of the head of a rivet or insert 81 which extends through a central aperture in the body 72. The lower ends of the base valve passageways 73 are normally closed by means of a laminated disk valve 87 which is normally retained in engagement with its valve seat by means of a spun over flange 89 on the lower end of the rivet or insert 81.

Thus, in operation, when the piston assembly 21 moves toward the base valve assembly 23, on the shock absorber compression stroke, fluid can flow from the lower side of the pressure cylinder 5 through the piston passageways 51, past disk 61, into the upper side of the pressure cylinder, and fluid can flow from the lower side of the pressure cylinder to the reserve chamber, as the result of piston rod displacement, through the base valve passageway 73, past the laminated disk valve 87 and into the reserve chamber. On the rebound stroke, the lower portion of the pressure cylinder is replenished by the flow of fluid from the reserve chamber through the base valve passageways 75, past the disk valve 77, and fluid flows from the upper portion of the pressure cylinder to the lower portion thereof, through the piston passageways 53, past the laminated disk valve 55.

In the past there has been considerable difficulty, at least in the mass production of shock absorbers, in properly loading the rebound piston valve, such as valve disk 55 illustrated in the drawing. This has resulted from the fact that generally the rebound valve has been loaded through a coil spring, which is sleeved on the reduced end of the piston rod and held in place by a nut. It has been very difficult to tighten the nut just the right amount so as to properly load the rebound valve and so as to insure that the rebound valve on all like shock absorbers will be identically loaded. Furthermore, as the nut serves to both load the rebound valve and secure the piston rod to the piston body, it often is subjected to extreme loads when the shock absorber is mounted on a vehicle, or the like, and these loads are imparted to and may adversely affect the operation of the rebound valve. With the construction of this invention, the rebound valve of all like shock absorbers can be consistently and uniformly loaded to a predetermined value by merely spinning over the end of a shank portion 35 of the insert 37, and as the piston rod 15 is connected to the piston body through a separate connection, that is the washer element 65, the operation of the rebound valve will not be affected in the event that the piston assembly is subjected to any excessive loads or impacts, which may be occasioned, for example, when the axle of a vehicle on which the shock absorber is mounted, is picked up. The piston assembly of this invention, therefore, is extremely durable and efficient and control losses of the rebound valve are held to a minimum.

The piston assembly illustrated in Fig. 3 is substantially identical to that illustrated in Figs. 1 and 2, and like parts in Fig. 3 are indicated by primed numbers corresponding to the like numbers in Figs. 1 and 2. The only difference in the piston assembly construction illustrated in Fig. 3, from that illustrated in Fig. 2, is that the extreme lower end of the piston rod reduced portion 45' is threaded at 91 and the central bore of the washer element 65' is threaded at 93, so that instead of spinning over or upsetting the lower end of the piston rod, the latter is merely threaded into the washer element 65' so as to connect the piston rod 15' to the piston body skirt 31', through the washer element 65'.

What is claimed is:

1. A piston assembly for a shock absorber, including a piston body having opposed faces providing valve seats and a peripheral skirt extending beyond one of said faces, a piston rod having one end thereof reduced so as to provide a shoulder intermediate the ends of said rod, said body having a substantially central aperture therethrough, a hollow insert extending through said body aperture and having a portion thereof engaging the other of said valve faces and a portion projecting beyond said one valve face, said reduced piston rod end extending through said insert so that the free end thereof projects beyond the said insert and so that said piston rod shoulder engages said insert adjacent said other piston body face, a retainer element connected with the free end of said piston rod reduced portion and engaging the end of said piston body skirt, so as to retain said piston rod, insert, and said piston body, in an assembled relationship, valve disk means engaging the valve seat on said one piston face so as to normally prevent the flow of fluid through said passageway in one direction, the projecting end of said insert being spun over into engagement with the inner peripheral portion of said valve disk means so as to normally retain said valve disk in engagement with said valve seat, a second passageway in said piston body, valve means engaging the valve seat of said other valve face for normally preventing the flow of fluid through said second passageway, and resilient means disposed between said insert and said valve means for resiliently retaining said valve means on said valve seat.

2. A piston assembly for a hydraulic shock absorber, including a piston body having first and second passageway means therethrough terminating adjacent opposed piston body faces providing valve seats, resilient valve means including a disk element engaging one of said valve seats for normally preventing the flow of fluid through one of said passageways in one direction, and valve means including a valve disk engaging the other of said valve seats for normally preventing the flow of fluid through the other of said passageway means in one direction, each of said valve means being adapted to have at least a portion thereof moved off of said valve seat by fluid pressure so as to permit the flow of fluid through the respective passageway means in one direction, a one-piece tubular element having a portion abutting said piston body and a portion extending through said piston body and valve means and having portions thereof engaging each of said valve means so as to normally retain each of said valve means in engagement with its respective valve seat, and a piston rod having a reduced end extending through said one-piece tubular element so that the enlarged portion thereof, adjacent said reduced end, engages said one-piece tubular element, and a retainer element on said piston rod reduced end engaging said piston body in spaced relation to said piston body faces and connecting the reduced end of said piston rod to said piston body so as to retain said piston rod, insert and piston body in an assembled position.

3. A piston assembly for shock absorbers, including a piston body having first and second passageway means therethrough terminating adjacent opposite piston body faces, valve elements normally preventing the flow of fluid through each of said passageway means in opposite directions, a piston rod having one end thereof extending through said piston body, a single member abutting one of said piston body faces and engaging both of said valve elements simultaneously so as to normally retain each of said valve members in a position to normally close said passageway means, and a substantially rigid element engaging said piston body and said piston rod end and connecting said piston rod to said piston body so as to prevent relative movement between said piston body and said piston rod.

DALE A. PALMER.

References Cited in the file of this patent

UNITED STATES PATENTS

| Number | Name | Date |
|---|---|---|
| 2,107,974 | Bechereau et al. | Feb. 8, 1938 |
| 2,239,112 | Nickelsen | Apr. 22, 1941 |
| 2,324,058 | Boor et al. | July 13, 1943 |
| 2,537,423 | Rossman | Jan. 9, 1951 |
| 2,546,051 | Whisler, Jr. | Mar. 20, 1951 |